(12) United States Patent
Morikawa et al.

(10) Patent No.: US 12,280,409 B2
(45) Date of Patent: Apr. 22, 2025

(54) METHOD FOR PREVENTING THE DIFFUSION OF SOIL FUMIGANT

(71) Applicant: KURARAY CO., LTD., Okayama (JP)

(72) Inventors: Keisuke Morikawa, Houston, TX (US); Pablo Garcia, Houston, TX (US); Levi Neufeld, Houston, TX (US)

(73) Assignee: KURARAY CO., LTD., Okayama (JP)

( * ) Notice: Subject to any disclaimer, the term of this patent is extended or adjusted under 35 U.S.C. 154(b) by 203 days.

(21) Appl. No.: 17/718,176

(22) Filed: Apr. 11, 2022

(65) Prior Publication Data

US 2022/0331849 A1    Oct. 20, 2022

Related U.S. Application Data

(60) Provisional application No. 63/173,612, filed on Apr. 12, 2021.

(51) Int. Cl.
| | |
|---|---|
| *B09C 1/08* | (2006.01) |
| *A01M 13/00* | (2006.01) |
| *C09K 17/52* | (2006.01) |
| *D21H 19/40* | (2006.01) |
| *D21H 19/60* | (2006.01) |

(52) U.S. Cl.
CPC ............ *B09C 1/08* (2013.01); *A01M 13/003* (2013.01); *C09K 17/52* (2013.01); *D21H 19/40* (2013.01); *D21H 19/60* (2013.01); *B09C 2101/00* (2013.01)

(58) Field of Classification Search
CPC .... B09C 1/08; B09C 2101/00; A01M 13/003; C09K 17/52; D21H 19/40; D21H 19/60; B32B 2307/7163; B32B 27/10; B32B 2255/28; Y02W 30/30; A01G 13/0268
See application file for complete search history.

(56) References Cited

U.S. PATENT DOCUMENTS

| | | | |
|---|---|---|---|
| 2013/0019523 A1* | 1/2013 | Cruickshank | B32B 29/04 47/9 |
| 2018/0355248 A1* | 12/2018 | Backfolk | A01G 13/0275 |
| 2019/0119414 A1* | 4/2019 | Takayama | C08F 6/08 |
| 2020/0291580 A1* | 9/2020 | Jung | D21H 23/56 |
| 2021/0153502 A1* | 5/2021 | Ueda | C05G 5/10 |
| 2022/0033158 A1* | 2/2022 | Boswell | B32B 27/10 |
| 2022/0112664 A1* | 4/2022 | Boswell | D21H 19/12 |

FOREIGN PATENT DOCUMENTS

JP        2017000016   *   1/2017   ............. Y02A 40/25

* cited by examiner

*Primary Examiner* — Carib A Oquendo
(74) *Attorney, Agent, or Firm* — Morgan, Lewis & Bockius LLP

(57) ABSTRACT

The present disclosure relates to a barrier paper comprising a paper coated with polyvinyl alcohol composition, and a method for reducing diffusion of soil fumigant using the same.

21 Claims, No Drawings

METHOD FOR PREVENTING THE DIFFUSION OF SOIL FUMIGANT

FIELD OF THE DISCLOSURE

This disclosure relates to a method for preventing the diffusion of soil fumigant covering a fumigated soil surface with a barrier paper having polyvinyl alcohol.

BACKGROUND OF THE DISCLOSURE

To control pests that damage crops, soil fumigation has traditionally been carried out by injecting, pouring, or mixing soil fumigants containing pesticide components used for soil disinfection, such as methyl bromide, methyl isothiocyanate, chloropicrin, ammonium methyldithiocarbamate, sodium methyldithiocarbamate, tetrahydro-3,5-dimethyl-1,3,5-thiadiazine-2-thion, and mixtures thereof into the soil. This method, however, requires a large amount of pesticide components to disinfect the soil sufficiently, since the pesticide components are diffused into the atmosphere. To solve these problems, the soil surface with the above-mentioned soil fumigant was covered with a gas barrier film made solely of resin, such as a polyethylene terephthalate film.

Soil fumigation films or sheets, etc., may need to be collected from forests or agricultural fields and disposed of after use. The collection and disposal of soil fumigation films and sheets require a great deal of labor and expense to transport a large amount of soil fumigation films and sheets from the fumigation site, such as in the mountains, to the disposal facility, and cause various environmental contaminations depending on the disposal method. In other words, when plastic soil fumigation films or sheets are finally buried in the soil, the plastic products will continue to accumulate over a long period, and there is a risk of softening the ground where the plastic products are buried. In addition, depending on the type of plastic, incineration may cause damage to the incinerator due to the high heat generated during combustion or emit toxic substances such as dioxin.

By using biodegradable plastic as a material, such as a plastic fumigation film or sheet, microorganisms can be decomposed by burying the fumigated material in the soil at the fumigation site without transporting it to a disposal facility after the fumigation process. However, due to the low gas barrier property of biodegradable plastics, it was difficult to obtain a film with high fumigation effect on its own. As a fumigation film with both biodegradability and a gas barrier property, a biodegradable sheet for soil fumigation consisting of a film containing biodegradable resins such as aliphatic aromatic polyesters, aliphatic polyesters, and polylactic acid, and a polyvinyl alcohol film, which is also a biodegradable resin, was proposed. However, there is a need to improve the biodegradability and manufacturing cost.

These references offer limited guidance concerning specific soil fumigation films or sheets.

It thus remains desirable to have methods for preventing or reducing the diffusion of soil fumigant, wherein the methods have improved utility and performance, which methods are characterized by a low environmental load and an excellent gas barrier property.

SUMMARY

In one aspect, the present disclosure provides a barrier paper or a multilayer soil-covering sheet comprising a paper and a polyvinyl alcohol. In some embodiments, the barrier paper or a multilayer soil-covering sheet comprises a polyvinyl alcohol layer comprising a polyvinyl alcohol. In another aspect, the present disclosure also provides a polyvinyl alcohol composition to coat the paper in producing the barrier paper or a multilayer soil-covering sheet. In another aspect, the present disclosure provides a method of preventing or reducing diffusion of soil fumigant by covering at least a part of soil with the barrier paper or the multilayer soil-covering sheet described herein.

In some embodiments, the polyvinyl alcohol has a degree of saponification of from 85.00 to 99.99 mol %. In additional embodiments, the polyvinyl alcohol may be modified with ethylene. In further embodiments, the polyvinyl alcohol layer or the barrier paper may exclude a copolymer of ethylene and vinyl alcohol having an ethylene content of 18 mol % or more. In yet further embodiments, the polyvinyl alcohol is modified with carboxylic acid or a salt thereof.

In some embodiments, the barrier paper comprises a plurality of different polyvinyl alcohol layers. In some embodiments, a total thickness of polyvinyl alcohol layers in the barrier paper is from 0.8 μm to 12 μm.

In some embodiments, an amount of the polyvinyl alcohol is from 1 to 15 g per $m^2$ of the barrier paper ($g/m^2$-paper).

In some embodiments, the polyvinyl alcohol layer further comprises from 5 wt % to 50 wt % of an inorganic compound based on the weight of the polyvinyl alcohol. In additional embodiments, the inorganic compound comprises a clay-based mineral. In yet additional embodiments, the inorganic compound comprises at least one clay material selected from the group consisting of montmorillonite, bidelite, nontronite, saponite, soconite, stubbensite, hectorite, and clay minerals thereof treated with an organic matter. In further embodiments, the inorganic compound has an average diameter of 5 μm or less.

In some embodiments, the polyvinyl alcohol layer further comprises a cross-linking agent, wherein the cross-linking agent comprises an organic titanium compound. In some embodiments, the polyvinyl alcohol layer further comprises a cross-linking agent, wherein the cross-linking agent comprises a polyamide-polyamine-epichlorohydrin resin.

In some embodiments, the polyvinyl alcohol layer is formed by coating a polyvinyl alcohol composition on a paper. In additional embodiments, the polyvinyl alcohol composition has a viscosity of 4 wt % polyvinyl alcohol composition at 20° C. of from 2.5 mPa second to 100 mPa second. In further embodiments, the polyvinyl alcohol composition is heat-dried at a temperature described herein.

In some embodiments, the paper has a basis weight from 10 to 300 $g/m^2$-paper.

In some embodiments, the barrier paper or the multilayer soil-covering sheet has a mass transfer coefficient of methyl bromide of less than 1 cm/h. In additional embodiments, the barrier paper has a mass transfer coefficient of methyl bromide of less than 0.4 cm/h.

In some embodiments, the method of preventing or reducing diffusion of soil fumigant by covering at least a part of soil with the barrier paper or the multilayer soil-covering sheet described herein may further comprise covering at least a part of the barrier paper or the multilayer soil-covering sheet with soil. In additional embodiments, the barrier paper or the multilayer soil-covering sheet covered with soil comprises a pesticide.

DETAILED DESCRIPTION

In one aspect, the present disclosure provides a barrier paper or a multilayer soil-covering sheet comprising a paper and a polyvinyl alcohol. In another aspect, this disclosure also relates to a method for preventing the diffusion of soil fumigant that has a low environmental load and an excellent gas barrier property.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meanings as commonly understood by one of ordinary skill in the art to which this disclosure belongs. In case of a conflict, the present specification, including definitions, will control.

Except where expressly noted, trademarks are shown in uppercase.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end point of a range, the disclosure should be understood to include the specific value or end point referred to. The use of "about" is intended to take into account some reasonable variance from the specific value that would ordinarily occur in industrial-scale or commercial-scale situations. In some embodiments, the term "about" refers to a range of values that fall within 10, 9, 8, 7, 6, 5, 4, 3, 2, 1 percent or less of the stated reference value.

As used herein, the terms "comprises," "comprising," "includes," "including," "has," "having" or any other variation thereof, are intended to cover a nonexclusive inclusion. For example, a process, method, article, or apparatus that comprises a list of claim elements is not necessarily limited to only those elements but can include other elements not expressly listed or inherent to such process, method, article, or apparatus.

The transitional phrase "consisting of" excludes any claim element or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified claim elements, materials or steps and those others that do not materially affect the basic and novel characteristic(s) of the claimed invention. A "consisting essentially of" claim thus occupies a middle ground between closed claims that are written in a "consisting of" format, and fully open claims that are drafted in a "comprising" format. Optional additives as defined herein, at a level that is appropriate for such additives, and minor impurities are not excluded from a composition by the term "consisting essentially of."

Further, unless expressly stated to the contrary, "or" and "and/or" are inclusive rather than exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one, and the singular also includes the plural unless it is obvious that it is meant otherwise.

The term "predominant portion," as used herein, unless otherwise defined herein, means greater than 50% of the referenced material. If not specified, the percent is on a molar basis when reference is made to a molecule (such as hydrogen, methane, carbon dioxide, carbon monoxide and hydrogen sulfide), and otherwise is on a weight basis (such as for carbon content).

The term "substantial portion" or "substantially," as used herein, unless otherwise defined, means all or almost all or the vast majority, as would be understood by a person of ordinary skill in the relevant art in the context used. It is intended to take into account some reasonable variance from 100% that would ordinarily occur in industrial-scale or commercial-scale situations.

The term "depleted" or "reduced" is synonymous with reduced from what is originally present. For example, removing a substantial portion of a material from a stream would produce a material-depleted stream that is substantially depleted of that material. Conversely, the term "enriched" or "increased" is synonymous with greater than what is originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising vinyl acetate and 15 mol % of a comonomer," or a similar description. Such a description may be considered informal in that it does not refer to the comonomers as copolymerized units in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

As ascertainable from the context, the term "composition" will typically be used to refer to more than one polymer and/or copolymer together, and optionally other types of components blended or admixed therewith, but can permissibly also be used to refer to just one polymer or copolymer by itself.

The term "unit" refers to a unit operation. When more than one "unit" is described as being present, those units are operated in a parallel fashion unless otherwise stated. A single "unit," however, may comprise more than one of the units in a series, or in parallel, depending on the context. For example, a thermal treating unit may comprise a first cooling unit followed in a series by a second cooling unit.

The terms "substantially soluble in water" and "soluble in water" mean substantially completely (or completely) soluble in deionized water under the stated conditions.

The terms "substantially soluble in brine" and "soluble in brine" mean substantially completely (or completely) soluble in brine (i.e., a water solution with NaCl concentration of up to 2.9 wt %) under the stated conditions.

For convenience, many elements of this invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

The present invention is not limited to the embodiments described below. The degree of saponification of the polyvinyl alcohol used in the present disclosure may be measured in accordance with JIS K 6726 (1994). In some embodiments, the degree of saponification is from 85.00 to 99.99 mol %. If the degree of saponification is less than 85.00 mol %, the water resistance of the barrier paper may become insufficient. The degree of saponification is preferably 88.00 mol % or more, and it may be preferable to have 93.00 mol % or more. On the other hand, if the degree of saponification exceeds 99.99 mol %, it makes it difficult to use the polyvinyl alcohol on a barrier paper and also makes the polyvinyl alcohol difficult to manufacture. The degree of saponification is preferably less than 99.95 mol %, and more preferably less than 99.90 mol %. In further embodiments, the degree of saponification may be from about 85, 86, 87, 88, 89, 90, 91, 92, 93, 94, 95, 96, 97, 98, 99, 99.10, 99.20, or 99.30 mol % to about 99.40, 99.50, 99.60, 99.70, 99.80, 99.90 mol %.

Polyvinyl alcohol cannot readily be produced directly from vinyl alcohol. Instead, polyvinyl alcohol is produced on a commercial scale by polymerizing vinyl acetate (with optional comonomers) to generate polyvinyl acetate, after which the acetate groups are hydrolyzed to hydroxyl groups in varying degrees. Several different hydrolysis (saponification) methods are well known and can be used for this purpose.

In the present disclosure, polyvinyl alcohols can be modified, and such modified polyvinyl alcohols can be obtained by copolymerizing vinyl ester with various comonomers and following saponification. In some embodiments, "post-modification techniques" can be used to introduce one or more functional groups to polyvinyl alcohols. In post-modification techniques, polyvinyl alcohols can be "post-modified" by a reaction of polyvinyl alcohols with some compounds having functional groups during/after saponification of the polyvinyl alcohols. In some embodiment, the aforementioned modification can be done as long as the barrier properties of polyvinyl alcohols is not lost. In some embodiments, a hydrolyzed copolymer of vinyl ester and one or more comonomers can be post-modified.

Some of the examples of such comonomers include olefins such as ethylene, propylene, isobutylene, α-octene, α-dodecene, and α-octadecene; unsaturated acids such as acrylic acid, methacrylic acid, crotonic acid, maleic acid, maleic anhydride, and itaconic acid or their salts, and their mono or dialkyl esters; nitriles such as acrylonitrile and methacrylonitrile; amides such as acrylamide and methacrylamide; olefin sulfonic acid or its salts such as ethylene sulfonic acid, aryl sulfonic acid, and metaaryl sulfonic acid; alkyl vinyl ethers; N-acrylamide methyl trimethylammonium chloride; aryl trimethylammonium chloride; dimethyl allyl vinyl ketone; N-vinyl pyrrolidone; vinyl chloride; vinyl chloride; vinylidene chloride; polyoxyalkylene (meth)aryl ether such as polyoxyethylene (meth)aryl ether, polyoxypropylene (meth)aryl ether; polyoxyalkylene (meth)acrylate such as polyoxyethylene (meth)acrylate, polyoxypropylene (meth)acrylate; polyoxyalkylene (meth)acrylamide such as polyoxyethylene (meth)acrylamide, polyoxypropylene (meth)acrylamide; polyoxyethylene [1-(meth)acrylamide-1, 1-dimethyl propyl] ester; polyoxyalkylene vinyl ether such as polyoxyethylene vinyl ether and polyoxypropylene vinyl ether; polyoxyethylene allyl amine such as polyoxyethylene allylamine and polyoxypropylene allyl amine; polyoxyalkylene vinyl amine such as polyoxyethylene vinyl amine and polyoxypropylene vinyl amine; hydroxy group-containing α-olefins such as 3-butene-1-ol, 4-penthene-1-ol, 5-hexene-1-ol and derivatives such as their acyl compounds.

Nonlimiting examples of such comonomers include 3,4-dihydroxy-1-butene, 3,4-diacyroxy-1-butene, 3-acyroxy-4-hydroxy-1-butene, 4-acyroxy-3-hydroxy-1-butene, 3,4-diacyroxy-2-methyl-1-butene, 4,5-dihydroxy-1-pentene, 4,5-diacyroxy-1-pentene, 4,5-dihydroxy-3-methyl-1-pentene, 4,5-dihydroxy-3-methyl-1-pentene, 4,5-diacyroxy-3-methyl-1-pentene, 5,6-dihydroxy-1-hexene, 5,6-diacyroxy-1-hexene, glycerin monoaryl ether, 2,3-diacetoxy-1-aryloxypropane, 2-acetoxy-1-aryloxy-3-hydroxypropane, 3-acetoxy-1-aryloxy-2-hydroxypropane, glycerin monovinyl ether, glycerin monoisopropenyl ether, vinyl ethylene carbonate, and compounds having diols such as 2,2-dimethyl-4-vinyl-1,3-dioxolane.

Some of the examples of post-modified polyvinyl alcohols include the post-modified polyvinyl alcohol having an acetoacetyl group by reaction with diketene, a polyalkylene oxide group by reaction with ethylene oxide, a hydroxyalkyl group by reaction with an epoxy compound, etc., and a polymer obtained by reacting an aldehyde compound having various functional groups with a polyvinyl alcohol.

In some embodiments, the barrier paper for soil fumigation is used outdoors, and water resistance may be beneficial. In such cases, hydrophobic polyvinyl alcohols are preferred. Nonlimiting examples of such polyvinyl alcohols include a polyvinyl alcohol modified with olefins such as ethylene, propylene, isobutylene, α-octene, α-dodecene, and/or α-octadecene. In some embodiments, a polyvinyl alcohol modified with ethylene is preferable from a manufacturing standpoint. The modification amount of ethylene is preferably at least 1 mol % and less than 10 mol %, and more preferably at least 1.5 mol % and less than 9 mol %. In additional embodiments, the polyvinyl alcohol layer described herein may have about 0.5, 0.6, 0.7, 0.8, 0.9, 1.0, 1.1, 1.2, 1.3, 1.4, 1.5, 1.6, 1.7, 1.8, 1.9, 2, 2.5, 3, 4, 5, 6, 7, 8 mol % or more and/or about 3, 4, 5, 6, 7, 8, 9, 10, 11, 12, 13, 14, 15 mol % or less of ethylene based on an amount of polyvinyl alcohol in the layer.

In some embodiments, from the viewpoint of imparting water resistance, carboxylic modified polyvinyl alcohols may increase the cross-linking property. Nonlimiting examples of such polyvinyl alcohols include a polyvinyl alcohol modified with acrylic acid, methacrylic acid, crotonic acid, maleic acid, maleic anhydride, and itaconic acid or their salts, or carboxylic acids, such as mono or dialkyl esters thereof or their salts. In some embodiments, the amount of carboxylic acid or the salt in the polyvinyl alcohol described herein is preferably at least 0.1 mol % and less than 10 mol %, and preferably at least 0.5 mol % and less than 5 mol %. In some embodiments, the amount of carboxylic acid or the salt in the polyvinyl alcohol described herein may be about 0.1, 0.2, 0.3, 0.4, 0.5, 0.6, 0.7, 0.8, 0.9, 1, 2, 3, 4 mol % or more and/or about 10, 9, 8, 7, 6, 5, 4 mol % or less.

The polyvinyl alcohol used in the present disclosure may be manufactured by polymerizing vinyl ester monomers, such as vinyl acetate, and saponifying them.

For example, vinyl propionate, vinyl butyrate, vinyl caproate, caprylic acid, capric acid, vinyl laurate, vinyl myristate, vinyl palmitate, vinyl stearate, cyclohexanecarboxylic acid, vinyl pivarate, vinyl octylate, vinyl monochloroacetate, vinyl adipate, vinyl methacrylate, vinyl crotonate, vinyl sorbate, vinyl benzoate, vinyl cinnamic acid, vinyl trifluoroacetate, etc. may be used as the above vinyl ester monomers, but from the viewpoint of price and ease of availability, vinyl acetate is preferably used.

The polymerization of the vinyl ester monomer may be carried out by any known polymerization method, for example, solution polymerization, suspension polymerization, or emulsion polymerization. In some embodiments, it is preferable to conduct solution polymerization under reflux to remove the reaction heat efficiently. Alcohol may be used as the solvent for solution polymerization, preferably a lower alcohol with a carbon number of 1 to 3.

For the saponification of the obtained polymers, the saponification method known in the past can also be adopted. In other words, the polymer may be dissolved in an alcohol or water/alcohol solvent using an alkaline or acid catalyst. As the alkaline catalysts, for example, hydroxides or alcolates of alkali metals such as potassium hydroxide, sodium hydroxide, sodium methylate, sodium ethylate, potassium methylate, lithium methylate, etc. can be used.

The reaction temperature of the saponification may be 20° C. to 60° C. If the reaction temperature is too low, the reaction rate tends to be small and the efficiency of the reaction decreases, while if it is too high, it may exceed the boiling point of the reaction solvent, which tends to reduce the safety of the production. When saponification is carried out under high pressure using a continuous saponification column with high-pressure resistance, saponification can be carried out at a higher temperature (e.g., 80° C.-150° C.), and a small amount of saponification catalyst can be used to obtain a high saponification degree in a short time.

The modified polyvinyl alcohol can be obtained by adding the above-mentioned monomer during the copolymerization process. The polyvinyl alcohol may be modified by one monomer kind or may be modified by several monomers together.

The polyvinyl alcohol used in the present disclosure may be either one kind or a mixture of two or more kinds. Examples of such mixture are a combination of two or more unmodified polyvinyl alcohols with different degrees of saponification, average degree of viscosity, melting point, etc.; a combination of an unmodified polyvinyl alcohol and a modified polyvinyl alcohol; or a combination of two or more modified polyvinyl alcohols with different degrees of saponification, average degree of viscosity, melting point, type of functional group, modification degree, etc.

The barrier paper for soil fumigation of the present disclosure may include an inorganic compound in or on the polyvinyl alcohol layer for the purpose of improving the barrier property. In some embodiments, the inorganic compounds are clay-based minerals, whether natural or synthetic. In some embodiments, the inorganic compound may be deposited as an inorganic layered compound.

Among the above clay-based minerals, smectite, vermiculite and mica families are preferable, and from the standpoint of gas-blocking properties and flexibility, the smectite and mica families are more preferable. Preferred clay minerals of the smectite family include, for example, montmorillonite, bidelite, nontronite, saponite, soconite, stubbensite, hectorite, and those clay minerals treated with organic matter (hereinafter referred to as organo-modified clay minerals). In some embodiments, in terms of flexibility, montmorillonite is more preferable.

In some embodiments, the inorganic compound of the polyvinyl alcohol layer has an average particle diameter of about 10 μm or less. The average particle size of the inorganic compound is preferably about 5 μm or less, preferably about 3 μm or less, preferably about 2 μm or less, or preferably about 1 μm or less. If the average grain length exceeds 10 μm, the flexibility is inferior. In additional embodiments, the average particle size of the inorganic compound is at least about 1, 2, or 3 μm. In some embodiments, the inorganic compound has an aspect ratio in the range from about 20 to about 3,000 in terms of the balance between a gas-barrier property and flexibility. If the aspect ratio is less than 20, the gas-barrier property of the film tends to decrease, and if it is greater than 3,000, the flexibility of the film tends to decrease. In some embodiments, the aspect ratio is from about 20, 30, 40, 50, 60, 70, 80, 90, 100, 110, 120, 130, 140, 150, 160, 170, 180, 190, 200, 300, 500, 600, 700, 800, 900, 1000, 1500, 2000, 2500 to about 300, 500, 1000, 1500, 2000, 2500, 2800, 2900, or 3000.

In some embodiments, the polyvinyl alcohol layer or the polyvinyl alcohol composition described herein contains from 5 weight parts to 50 weight parts of the inorganic compound to 100 weight parts of the vinyl alcohol-based polymer in the polyvinyl alcohol layer or the polyvinyl alcohol composition, respectively, and more preferably from 10 weight parts to 40 weight parts of the inorganic compound. If the content of the inorganic compound is less than 5 parts by weight, improvement of the gas barrier property may not be sufficient; if the content is greater than 50 parts by weight, barrier paper flexibility may be inferior. In some embodiments, the polyvinyl alcohol layer or the polyvinyl alcohol composition described herein contains from about 5, 6, 7, 8, 9, 10, 11, 12, 13, 14, 15, 16, 17, 18, 19, 20 to about 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 weight parts of the inorganic compound.

The barrier paper for soil fumigation of the present disclosure may have a cross-linking agent added to the polyvinyl alcohol layer for the purpose of improving water resistance. Cross-linking agents include, for example, polyvalent isocyanate compounds; hydrazine compounds; polyamide-polyamine-epichlorohydrin resin; water-soluble aluminum salts such as aluminum chloride and aluminum nitrate; glyoxal and glyoxylic acid; organotitanium compounds; and dialdehyde compounds such as formaldehyde, acetaldehyde, glutaraldehyde and their derivatives. The organotitanium compounds include titanium lactate, partial or complete neutralizers of titanium lactate (e.g., titanium lactate ammonium salts such as titanium lactate monoammonium salts, titanium lactate diammonium salts; titanium lactate sodium salts such as titanium lactate monosodium salts and titanium lactate disodium salts; titanium lactate potassium salts such as titanium lactate monopotassium salts and titanium lactate dipotassium salts), diisopropoxy titanium bis (triethanolaminate), di-n-butoxy titanium bis (triethanolaminate), diisopropoxy titanium bis (acetyl acetonate), titan tetrakis (acetyl acetonate), polytitan bis (acetyl acetonate), tetraisopropoxy titanium, tetra-n-butoxy titanium, and titanium tetra stearate. Among these titanium compounds, organic titanium compounds having chelated ligands and water-soluble properties are preferable. Specifically, titanium lactate, partial or complete neutralization of titanium lactate, diisopropoxy titanibis (triethanolaminate), and di-n-butoxy titanibis (triethanolaminate) are preferably employed, and titanium lactate or its partial or complete neutralization is more preferably employed. As a partial or complete neutralizer of titanolactate, ammonium titanolactate salts are preferable. These cross-linking agents do not necessarily have to be used alone, and two or more can be used in a mixture as needed. In particular, from the perspective of improved handling and barrier properties, organotitanium compounds and polyamide-polyamine-epichlorohydrin resin are preferable.

In some embodiments, the amount of the cross-linking agent added is 5 to 50 parts by weight or 10 to 40 parts by weight to 100 parts by weight of the vinyl alcohol-based polymer in the polyvinyl alcohol layer or the polyvinyl alcohol composition described herein. In some embodiments, the amount of the cross-linking agent added is from about 5, 6, 7, 8, 9, 10, 11, 12, 13, 14, 15, 16, 17, 18, 19, 20, 21, 22, 23, 24, 25, 26, 27, 28, 29 or 30 to about 20, 21, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight to 100 parts by weight of the vinyl alcohol-based polymer in the polyvinyl alcohol layer or polyvinyl alcohol composition.

The polyvinyl alcohol layer may contain other components to the extent that they do not interfere with the effect of the present disclosure. Such other components include, for example, viscosity adjusters, adhesion improvers, defoaming agents, plasticizers, preservatives, antioxidants, penetrating agents, surfactants, inorganic pigments, organic pigments, fillers, starch and its derivatives, cellulose and its derivatives, sugars, latex, polylactic acid, polyglycolic acid, poly(3-hydroxybutyrate-3-hydroxyhexanoate), polybutylene succinate, polyethylene terephthalate succinate, polybutylene adipate terephthalate, and the like.

The barrier paper of the present disclosure may comprise one vinyl alcohol polymer layer, or may comprise multiple layers of vinyl alcohol polymer, or may comprise multiple layers of vinyl alcohol polymer and a layer of starch, biodegradable polymer, or the like. In terms of both barrier and water resistance, barrier paper with multiple layers is preferable.

As the paper or paper base material for the barrier paper of the disclosure, any known paper or synthetic paper obtained by extracting pulp, including, but not limited to, chemical pulp, such as hardwood kraft pulp and softwood kraft pulp, or mechanical pulp, such as GP (crushed wood pulp), RGP (refinery ground pulp) and TMP (thermomechanical pulp), may be used. In addition, the paper base material may contain organic and inorganic pigments as well as auxiliary paper-making chemicals such as paper strength enhancers, sizing agents, pH adjustment agents, filterability enhancers, dyes, filler agents, paper retention enhancers, etc. In addition, the paper base material may be given various surface treatments. The basis weight of paper base material is not particularly limited, but 10-300 g/m$^2$ is preferable and 30-200 g/m$^2$ is more preferable. In some embodiments, the basis weight of the paper base material may be from about 10, 20, 30, 40, 50, 51, 52, 53, 54, 55, 56, 57, 58, 59, 60, 61, 62, 63, 64, 65, 66, 67, 68, 69 or 70 g per m$^2$ of the paper to about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 105, 110, 120, 130, 140, 150, 160, 170, 180, 190, 200, 250, or 300 g per m$^2$ of the paper.

As the paper or paper base material for the barrier paper of the disclosure, any known paper or synthetic paper may be used, including, but not limited to, woodfree paper, medium quality paper, alkaline paper, glassine paper, semi-glassine paper or kraft paper. In terms of barrier and strength, glassine paper, semi-glassine paper or kraft paper is preferable. The kraft paper described herein may be a paper produced from chemical pulp produced by kraft process removing lignin from woods. The glassine paper described herein may be a paper produced from sulfite pulp beaten finely and high pressed by supercalender. In some embodiments, sulfite pulp that has been finely braten for a long time is used as a raw material, and high-pressure processing may be performed using a smooth roller called supercalender.

In some embodiments, the paper or paper base material for the barrier paper of the present disclosure may be biodegradable.

In one aspect, a composition, such as a solution, containing the polyvinyl alcohol described herein may be applied to the paper. In some embodiments, the barrier paper may be obtained by preparing a polyvinyl alcohol composition described herein, and then coating and drying the polyvinyl alcohol composition on the paper base material, or it may be coated by melt extrusion. The main component of the solvent of the polyvinyl alcohol composition may be water, but hydrophilic solvents may also be added. Examples of such hydrophilic solvents include alcohols, such as methanol, ethanol, and propanol; ketones, such as acetone and methyl ethyl ketone; ethers, such as tetrahydrofuran, cellosolve, and carbitol; and nitriles such as acetonitrile.

There are no particular restrictions on the method of applying the polyvinyl alcohol composition containing polyvinyl alcohols on the paper base material. The polyvinyl alcohol composition may be applied directly to the base material layer that is covering the soil by spraying, or the polyvinyl alcohol composition may be applied to the base material layer prior to covering the soil by any other publicly known method. For example, the polyvinyl alcohol composition may be applied to the base material in one layer or in multiple layers by an on-machine or off-machine coater equipped with a coating device such as a blade coater, air knife coater, transfer roll coater, rod-metaling size press coater, curtain coater, gravure coater, die coater, bar coater, spray coater, spin-dep method, etc.

In some embodiments, the polyvinyl alcohol described herein is dissolved in water. In additional embodiments, the solvent in which the polyvinyl alcohol is dissolved has at least about 60, 70, 80, 85, 90, 91, 92, 93, 94, 95, 96, 97, 98, 99 or 100% water. Polyvinyl alcohol is charged into room temperature water with agitation slowly, and the polyvinyl alcohol composition may be prepared by the methods described herein or the methods described in U.S. Patent Application Publication No. 2021/0009842 and JP2017043872 that are incorporated by reference herein.

In some embodiments, the viscosity of the polyvinyl alcohol composition at 4 wt % and 20° C. is not particularly limited to but preferably exceeds about 2.5 mPa second and is less than about 100 mPa second. In some embodiments, from the viewpoint of the strength of the polyvinyl alcohol layer on the paper described herein, the viscosity measured at 4 wt % and 20° C. exceeds about 3.0 mPa second, and more preferably 4.0 mPa second. On the other hand, in some embodiments, from the standpoint of workability and ease of handling, the viscosity is less than 60 mPa second, and more preferably less than 30.0 mPa second. In additional embodiments, the viscosity may be from about 2.5, 3, 4, 5, 6, 7, 8, 9, 10, 11, 12, 13, 14, 15, 16, 17, 18, 19, 20, 21, 22, 23, 24 or 25 mPa second to about 14, 15, 16, 17, 18, 19, 20, 21, 22, 23, 24, 25, 26, 27, 28, 29, 30, 40, 50, 60, 70, 80, 90 or 100 mPa second. The viscosity described herein is a value of a 4 wt % aqueous solution at 20° C. and may be measured by the method described in JIS K 67226 (1994). The B-type rotational viscometer is used as a measuring instrument.

In some embodiments, an amount of polyvinyl alcohol in the polyvinyl alcohol composition to be applied to a paper is about 4, 5, 6, 7, 8, 10 wt % or more and/or about 8, 9, 10, 11, 12, 13, 14, 15, 16, 17, 18, 19, 20, 25, or 30 wt % or less. In additional embodiments, the amount of polyvinyl alcohol in the polyvinyl alcohol composition is preferably 4-40 wt %, preferably 5%-30 wt %, preferably 6%-25 wt %, or preferably 6%-20 wt %.

In some embodiments, the polyvinyl alcohol composition described herein may further comprise one or more fertilizers and other additives, including hydrophobic pesticide additives. A "hydrophobic" pesticide additive refers to a pesticide additive that is not in and of itself soluble or stably dispersible in water (for example, without the use of a surfactant). Such hydrophobic pesticides are in general well known to those of ordinary skill in the relevant art and are generally commercially available. Examples of suitable fungicides include pyraclostrobin, fluxapyroxad, ipconazole, triflozystrobin, metalaxyl (metalaxyl 265 ST), fludioxonil (fludioxonil 4L ST), thiabendazole (thiabendazole 4L ST), itriticonazole, imidacloprid, tefluthrin and combinations thereof. Examples of suitable insecticides include clothianidin, imidacloprid, SENATOR® 600 ST (Nufarm US), tefluthrin, terbufos, cypermethrin, thiodicarb, lindane, furathiocarb, acephate and combinations thereof. The hydrophobic pesticides are typically utilized in minor amounts (an "effective amount" to achieve the desired pesticidal effect) in accordance with dosages recommended by the manufacturers of such pesticides.

In some embodiments, the polyvinyl alcohol composition may comprise one or more forms of a solution, dispersion, emulsion or suspension, as those terms are understood by persons of ordinary skill in the art. For example, some of the components in the polyvinyl alcohol composition may be in solution, while others may be dispersed, emulsified and/or suspended. In such case, the components dispersed, emulsified and/or suspended may be substantially evenly distributed in the polyvinyl alcohol solution prior to application. Thus, the coating composition may be a stable solution, emulsion and/or dispersion, or a solution, emulsion, dispersion and/or suspension in which the components can readily be evenly distributed via conventional means such as agitation with or without mild heating.

In some embodiments, other polymers compatible to polyvinyl alcohol, such as polyvinylpyrrolidone, starch and its derivatives, and high molecular weight polyethylene glycol, may be blended to the polyvinyl alcohol composition to enhance coating properties. Plasticizer, talc, pigment and detackifier may be optionally added to the polyvinyl alcohol composition described herein.

In some embodiments, the polyvinyl alcohol composition, layer or multilayer described herein may exclude a copolymer of ethylene and vinyl alcohol having an ethylene content of 18 mol % or more. In further embodiments, the polyvinyl alcohol composition, layer or multilayer described herein may exclude a copolymer of ethylene and vinyl alcohol having an ethylene content of 15 mol % or more.

In some embodiments, a polyvinyl alcohol composition described herein may be dried at a room temperature without adding heat. In additional embodiments, various heating and drying methods, such as hot air heating, gas heater heating, infrared heater heating, etc., can be adopted as appropriate as drying methods after coating the polyvinyl alcohol composition. In some embodiments, a polyvinyl alcohol composition described herein may be dried on a paper at a temperature of about 37, 38, 39, 40, 45, 50, 55, 60, 65, 70, 75, 80, 85, 90, 95, 100° C. or more and/or about 38, 39, 40, 45, 50, 55, 60, 65, 70, 75, 80, 85, 90, 95, 110, 110, 120, 130, 140 or 150° C. or less. In additional embodiments, the heat is applied to the polyvinyl alcohol composition for less than about 16, 15, 14, 13, 12, 11, 10, 9, 8, 7, 6 or 5 minutes.

If the amount of polyvinyl alcohol composition on the paper amount after drying is less than 1.0 g/m$^2$, the barrier property may not be sufficient. If the amount exceeds 15.0 g/m$^2$, the vinyl alcohol-based polymer layer becomes too thick, and the resulting barrier paper may curl and become difficult to handle. In addition, the biodegradability of the obtained soil fumigation barrier paper may be reduced. In additional embodiments, an amount of total solids applied to or coated on a paper by the polyvinyl alcohol composition by applying and drying the polyvinyl alcohol composition described herein is from about 1, 2, 3, 4, 5, 6, 7, 8, 9, 10, 11, 12, 13 or 14 to about 5, 6, 7, 8, 9, 10, 11, 12, 13, 14 or 15 g/m$^2$.

In further embodiments, a thickness of a layer formed on the paper by applying and drying a polyvinyl alcohol composition described herein is from about 0.8 µm to about 12 µm. In some embodiments, the thickness of a layer formed on the paper by applying and drying a polyvinyl alcohol composition described herein is from about 0.5, 1, 2, 3, 4, 5, 6, 7, 8, 9, or 10 µm to about 2, 3, 4, 5, 6, 7, 8, 9, 10, 11 or 12 µm.

In order to enhance the barrier property of the barrier paper for soil fumigation, a polyvinyl alcohol composition described herein may be applied and dried after coating, and as long as the effect is not impaired, smoothing treatment may be performed. For the smoothing process, supercalender, gross calender, multi-nip calender, soft calender, belt-nip calender, etc. are preferably employed.

In some embodiments, the barrier performance of the barrier paper described herein may be evaluated by a mass transfer coefficient of methyl bromide measured at 20° C. and 85% RH on the paper. In additional embodiments, the barrier paper described herein has a mass transfer coefficient of methyl bromide of less than 1, 0.9, 0.8, 0.7, 0.6, 0.5, 0.4, 0.3, 0.2, 0.1, 0.09 cm/h. In order to enhance the barrier performance and water resistance of the barrier paper for soil fumigation, multiple layers of polyvinyl alcohol may be applied, or a layer of starch and its derivatives, cellulose and its derivatives, sugars, latex, polylactic acid, polyglycolic acid, poly(3-hydroxybutyrate-3-hydroxyhexanoate), polybutylene succinate, polyethylene terephthalate succinate, or polybutylene adipate terephthalate may be used. In further embodiments, a total thickness of a layer(s) formed on the paper by one or more polyvinyl alcohol composition described herein is from about 0.8 µm to about 12 µm. In some embodiments, the total thickness of all the layer(s)

formed on the paper by a polyvinyl alcohol composition described herein is from about 0.5, 1, 2, 3, 4, 5, 6, 7, 8, 9, or 10 μm to about 2, 3, 4, 5, 6, 7, 8, 9, 10, 11 or 12 μm.

The barrier paper for soil fumigation of the present disclosure has a low environmental load and an excellent gas barrier property, so that the amount of soil fumigant used can be reduced. In addition, the high gas barrier property reduces the diffusion of the soil fumigant, thereby reducing its negative impact on the environment.

In one aspect, the present disclosure relates to a multilayer soil-covering sheet comprising at least one layer comprising polyvinyl alcohol, for example, by coating a paper with the polyvinyl alcohol composition as described herein. In some embodiments, the multilayer soil-covering sheet comprises two or more polyvinyl alcohol layers formed by repeating the coating of the same or different polyvinyl alcohol composition described herein. In additional embodiments, the polyvinyl alcohol layer of the multilayer soil-covering sheet may be facing outside, not contacting the soil.

In one aspect, the present disclosure relates to a method for preventing or reducing diffusion of soil fumigant by covering at least a part of soil with the barrier paper or the multilayer soil-covering sheet described herein. In some embodiments, the method may further comprise covering at least a part of the barrier paper or the multilayer soil-covering sheet with soil. In additional embodiments, the barrier paper or the multilayer soil-covering sheet covered with soil comprises one or more fertilizers and other additives, including hydrophobic pesticide additives as described herein.

EXAMPLES

The following examples will facilitate a more complete understanding of the present disclosure but it is understood that the disclosure is not limited to the specific embodiments incorporated therein.

[Example 1] KURARAY POVAL™ 25-88 KL (a polyvinyl alcohol modified with carboxylic acid, available from Kuraray Co., LTD.) was used and 8 wt % aqueous solution was prepared. (Viscosity of the polyvinyl alcohol 4% aqueous solution at 20° C. was 25.0 mPa second, and the degree of saponification was 88.02 mol %.) The coating solution was prepared by adding 30 parts of polyamide-polyamine-epichlorohydrin resin to 100 parts of solid polyvinyl alcohol to the aqueous solution. This coating solution was applied to the 70 g/m² glassine paper base material with 100 seconds of air permeability (JIS P 8117 (2009), Oken-type smoothness and air permeability tester) using a bar coater. After coating, the paper was dried at 100° C. for 5 minutes to make the coated paper. The amount of coating was about 8.6 g/m² on a solid content basis. The barrier paper for soil fumigation was obtained by supercalendering the resulting coated paper. The mass transfer coefficient of methyl bromide was measured at 20° C. and 85% RH on the resulting coated paper, and the result was 0.31 cm/h.

[Example 2] An 8 wt % aqueous solution of EXCEVAL™ HR-3010 (a polyvinyl alcohol modified with ethylene having a viscosity of 4% aqueous solution at 20° C.: 14.0 mPa second, and a degree of saponification of 99.31 mol %, available from Kuraray Co., LTD.) was prepared, and to this aqueous solution mica dispersion solution was added, 20 weight parts of Somasif ME100 (a hydrophilic swellable mica, available from Katakura & Co-op Agri Corporation) as a solid to 100 weight parts of solid vinyl alcohol. This coating solution was coated on the 70 g/m² glassine paper base material with 100 seconds of air permeability (JIS P 8117 (2009), Oken-type smoothness and air permeability tester) with a bar coater. After coating, it was dried at 100° C. for 5 minutes. The coating and drying were carried out again, and the barrier paper after two coating layers was obtained. The total amount of coating was about 8.5 g/m² on a solid content basis. The barrier paper for soil fumigation was obtained by supercalendering the resulting coated paper. The mass transfer coefficient of methyl bromide was measured on the coated paper at 20° C. and 85% RH, and the result was less than 0.06 cm/h.

[Example 3] An 8 wt % aqueous solution of KURARAY POVAL™ 25-88 KL (a polyvinyl alcohol modified with carboxylic acid, having viscosity of 4% aqueous solution at 20° C.: 25.0 mPa second, a degree of saponification: 88.02 mol %) was prepared, and a coating solution was prepared by adding 30 weight parts of polyamide-polyamine-epichlorohydrin resin to 100 weight parts of solid polyvinyl alcohol. This coating solution was applied to the 70 g/m² glassine paper base material with 100 seconds of air permeability (JIS P 8117 (2009), Oken-type smoothness and air permeability tester) with a bar coater. After coating, the paper was dried at 100° C. for 5 minutes to make the coated paper. The amount of coating was about 4.3 g/m² on a solid-content basis. Furthermore, an 8 wt % aqueous solution of EXCEVAL HR-3010 was prepared, and a mica dispersion solution of Somasif ME100 was added to this aqueous solution, 20 wt % of Somasif ME100 as a solid to 100 wt % of solid vinyl alcohol. The coated paper was dried at 100° C. for 5 minutes. The additional amount of coating was about 4.3 g/m² on a solid-content basis. The barrier paper for soil fumigation was obtained by supercalendering the resulting coated paper. The mass transfer coefficient of methyl bromide was measured at 20° C. and 85% RH on the resulting coated paper, and the result was 0.08 cm/h.

[Comparative Example 1] The paper with 100 seconds of air permeability was used without any coating treatment. The material coefficient of methyl bromide was measured at 20° C. and 85% RH, and the result was more than 1.0 cm/h.

The present disclosure relates to multiple embodiments and is not limited to specific embodiments. Certain specific embodiments include the following embodiments.

Embodiment 1. A method of reducing diffusion of soil fumigant, comprising: covering fumigated soil with a barrier paper, wherein the barrier paper comprises a polyvinyl alcohol layer comprising a polyvinyl alcohol.

Embodiment 2. The method according to embodiment 1, wherein the polyvinyl alcohol has a degree of saponification of from 85.00 to 99.99 mol %.

Embodiment 3. The method according to embodiment 1 or embodiment 2, wherein the polyvinyl alcohol layer comprises polyvinyl alcohol modified with ethylene.

Embodiment 4. The method according to any one of embodiments 1 to 3, wherein the polyvinyl alcohol layer comprises polyvinyl alcohol modified with carboxylic acid or a salt thereof.

Embodiment 5. The method according to any one of embodiments 1 to 4, wherein the barrier paper comprises a plurality of different polyvinyl alcohol layers.

Embodiment 6. The method according to any one of embodiments 1 to 5, wherein a total thickness of polyvinyl alcohol layers in the barrier paper is from 0.8 μm to 12 μm.

Embodiment 7. The method according to any one of embodiments 1 to 6, wherein an amount of the polyvinyl alcohol is from 1 to 15 g per m² of the barrier paper (g/m²-paper).

Embodiment 8. The method according to any one of embodiments 1 to 7, wherein the polyvinyl alcohol layer further comprises from 5 wt % to 50 wt % of an inorganic compound based on the weight of the polyvinyl alcohol.

Embodiment 9. The method according to any one of embodiments 1 to 8, wherein the inorganic compound comprises a clay-based mineral.

Embodiment 10. The method according to any one of embodiments 1 to 9, wherein the inorganic compound comprises at least one clay material selected from the group consisting of montmorillonite, bidelite, nontronite, saponite, soconite, stubbensite, hectorite, and clay minerals thereof treated with an organic matter.

Embodiment 11. The method according to any one of embodiments 1 to 10, wherein the inorganic compound has an average diameter of 10 μm or less.

Embodiment 12. The method according to any one of embodiments 1 to 11, wherein the polyvinyl alcohol layer further comprises a cross-linking agent, wherein the cross-linking agent comprises either an organic titanium compound or a polyamide-polyamine-epichlorohydrin resin.

Embodiment 13. The method according to any one of embodiments 1 to 12, wherein the polyvinyl alcohol layer is formed by coating a polyvinyl alcohol composition on a paper.

Embodiment 14. The method according to embodiment 13, wherein the polyvinyl alcohol composition has a viscosity of 4 wt % aqueous solution at 20° C. of from 2.5 mPa second to 100 mPa second.

Embodiment 15. The method according to any one of embodiments 1 to 14, wherein the paper has a basis weight from 10 to 300 g/m²-paper.

Embodiment 16. The method according to any one of embodiments 1 to 15, wherein the barrier paper has a mass transfer coefficient of methyl bromide of less than 1 cm/h.

Embodiment 17. The method according to any one of embodiments 1 to 16, wherein the barrier paper has a mass transfer coefficient of methyl bromide of less than 0.4 cm/h.

Embodiment 18. The method according to any one of embodiments 1 to 17, wherein the polyvinyl alcohol layer excludes a copolymer of ethylene and vinyl alcohol.

Embodiment 19. The method according to any one of embodiments 1 to 18, wherein the barrier paper is biodegradable.

Embodiment 20. The method according to any one of embodiments 1 to 19, further comprising covering at least a part of the barrier paper with soil.

Embodiment 21. The method according to embodiment 20, wherein the barrier paper comprises a pesticide.

Embodiment 22. A polyvinyl alcohol composition to coat a paper in producing a barrier paper, the polyvinyl alcohol composition comprising polyvinyl alcohol having a degree of saponification of from 85.00 to 99.99 mol %.

Embodiment 23. A barrier paper comprising a paper on which polyvinyl alcohol having a degree of saponification of from 85.00 to 99.99 mol % is coated.

Embodiment 24. A multilayer soil-covering sheet for reducing the diffusion of soil fumigant comprising: a paper with a basis weight of 10 to 300 g/m²; and a polyvinyl alcohol layer, wherein the polyvinyl alcohol layer comprises a polyvinyl alcohol having a degree of saponification of 85.00 to 99.99 mol %.

Embodiment 25. A composition comprising or consisting of the polyvinyl alcohol composition of embodiment 22, the paper of embodiment 23, or the multilayer soil-covering sheet of embodiment 24, wherein the polyvinyl alcohol layer comprises polyvinyl alcohol modified with ethylene.

Embodiment 26. The composition according to embodiment 25, wherein the polyvinyl alcohol layer comprises polyvinyl alcohol modified with carboxylic acid or a salt thereof.

Embodiment 27. The composition according to embodiment 25 or 26, wherein the barrier paper comprises a plurality of different polyvinyl alcohol layers.

Embodiment 28. The composition according to any one of embodiments 25 to 27, wherein a total thickness of polyvinyl alcohol layers in the barrier paper is from 0.8 μm to 12 μm.

Embodiment 29. The composition according to any one of embodiments 25 to 28, wherein an amount of the polyvinyl alcohol is from 1 to 15 g per m² of the barrier paper (g/m²-paper).

Embodiment 30. The composition according to any one of embodiments 25 to 29, wherein the polyvinyl alcohol layer further comprises from 5 wt % to 50 wt % of an inorganic compound based on the weight of the polyvinyl alcohol.

Embodiment 31. The composition according to any one of embodiments 25 to 30, wherein the inorganic compound comprises a clay-based mineral.

Embodiment 32. The composition according to any one of embodiments 25 to 31, wherein the inorganic compound comprises at least one clay material selected from the group consisting of montmorillonite, bidelite, nontronite, saponite, soconite, stubbensite, hectorite, and clay minerals thereof treated with an organic matter.

Embodiment 33. The composition according to any one of embodiments 25 to 32, wherein the inorganic compound has an average diameter of 10 μm or less.

Embodiment 34. The composition according to any one of embodiments 25 to 33, wherein the polyvinyl alcohol layer further comprises a cross-linking agent, wherein the cross-linking agent comprises either an organic titanium compound or a polyamide-polyamine-epichlorohydrin resin.

Embodiment 35. The composition according to any one of embodiments 25 to 34, wherein the polyvinyl alcohol layer is formed by coating a polyvinyl alcohol composition on a paper.

Embodiment 36. The composition according to any one of embodiments 25 to 35, wherein the polyvinyl alcohol composition has a viscosity of 4 wt % aqueous solution at 20° C. of from 2.5 mPa second to 100 mPa second.

Embodiment 37. The composition according to any one of embodiments 25 to 36, wherein the paper has a basis weight from 10 to 300 g/m²-paper.

Embodiment 38. The composition according to any one of embodiments 25 to 37, wherein the barrier paper has a mass transfer coefficient of methyl bromide of less than 1 cm/h.

Embodiment 39. The composition according to any one of embodiments 25 to 38, wherein the barrier paper has a mass transfer coefficient of methyl bromide of less than 0.4 cm/h.

Embodiment 40. The composition according to any one of embodiments 25 to 39, wherein the polyvinyl alcohol layer excludes a copolymer of ethylene and vinyl alcohol.

Embodiment 41. The composition according to any one of embodiments 25 to 40, wherein the barrier paper is biodegradable.

Embodiment 42. The composition according to any one of embodiments 25 to 41, wherein the polyvinyl alcohol composition further comprises a pesticide.

What is claimed is:

1. A method of reducing diffusion of soil fumigant, comprising:
    covering fumigated soil with a barrier paper,
    wherein the barrier paper comprises (i) a paper or paper base material, and (ii) a polyvinyl alcohol layer comprising a polyvinyl alcohol modified with carboxylic acid or a salt thereof, and the barrier paper excludes a layer containing any additional cellulose.

2. The method according to claim 1, wherein the polyvinyl alcohol layer comprises polyvinyl alcohol modified with ethylene.

3. The method according to claim 1, wherein the barrier paper comprises a plurality of different polyvinyl alcohol layers.

4. The method according to claim 1, wherein an amount of the polyvinyl alcohol is from 1 to 15 g per m$^2$ of the barrier paper (g/m$^2$-paper).

5. The method according to claim 1, wherein the polyvinyl alcohol layer further comprises from 5 wt % to 50 wt % of an inorganic compound based on the weight of the polyvinyl alcohol.

6. The method according to claim 5, wherein the inorganic compound comprises a clay-based mineral.

7. The method according to claim 5, wherein the inorganic compound comprises at least one clay material selected from the group consisting of montmorillonite, bidelite, nontronite, saponite, soconite, stubbensite, hectorite, and clay minerals thereof treated with an organic matter.

8. The method according to claim 5, wherein the inorganic compound has an average diameter of 10 μm or less.

9. The method according to claim 1, wherein the polyvinyl alcohol layer further comprises a cross-linking agent, wherein the cross-linking agent comprises either an organic titanium compound or a polyamide-polyamine-epichlorohydrin resin.

10. The method according to claim 1, wherein the polyvinyl alcohol layer is formed by coating a polyvinyl alcohol composition on a paper.

11. The method according to claim 10, wherein the polyvinyl alcohol composition has a viscosity of 4 wt % aqueous solution at 20° C. of from 2.5 mPa second to 100 mPa second.

12. The method according to claim 1, wherein the paper has a basis weight from 10 to 300 g/m$^2$-paper.

13. The method according to claim 1, wherein the barrier paper has a mass transfer coefficient of methyl bromide of less than 1 cm/h.

14. The method according to claim 1, wherein the polyvinyl alcohol layer excludes a copolymer of ethylene and vinyl alcohol having an ethylene content 18 mol % or more.

15. The method according to claim 1, wherein the barrier paper is biodegradable.

16. The method according to claim 1, further comprising covering at least a part of the barrier paper with soil.

17. The method according to claim 16, wherein the barrier paper comprises a pesticide.

18. The method according to claim 1, wherein the paper or paper base material comprises at least one selected from the group consisting of kraft pulp, GP (crushed wood pulp), RGP (refinery ground pulp), TMP (thermomechanical pulp).

19. The method according to claim 1, wherein the paper or paper base material comprises at least one selected from the group consisting of woodfree paper, medium quality paper, alkaline paper, glassine paper, semi-glassine paper, and kraft paper.

20. A barrier paper comprising a paper on which polyvinyl alcohol modified with carboxylic acid or a salt thereof having a degree of saponification of from 85.00 to 99.99 mol % is coated, wherein the barrier paper excludes a layer containing any additional cellulose.

21. A multilayer soil-covering sheet for reducing the diffusion of soil fumigant comprising:
a paper with a basis weight of 10 to 300 g/m$^2$; and
a polyvinyl alcohol layer,
wherein the polyvinyl alcohol layer comprises a polyvinyl alcohol modified with carboxylic acid or a salt thereof having a degree of saponification of 85.00 to 99.99 mol %, and the multilayer soil-covering sheet excludes a layer containing any additional cellulose.

* * * * *